(12) United States Patent
Gupta et al.

(10) Patent No.: US 9,384,260 B1
(45) Date of Patent: Jul. 5, 2016

(54) STREAMING ROLL-UPS ON STATISTICAL DATA USING A STACK (71) Applicant: GOOGLE INC., Mountain View, CA (US)

(72) Inventors: Ashish Gupta, Sunnyvale, CA (US); Haifeng Jiang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 14/510,019

(22) Filed: Oct. 8, 2014

Related U.S. Application Data (63) Continuation of application No. 12/239,391, filed on Sep. 26, 2008, now abandoned.

(51) Int. Cl.
*G06F 15/16* (2006.01)
*G06F 17/30* (2006.01)

(52) U.S. Cl.
CPC .... *G06F 17/30598* (2013.01); *G06F 17/30454* (2013.01); *G06F 17/30489* (2013.01); *G06F 17/30592* (2013.01)

(58) Field of Classification Search
CPC .............. G06F 17/30592; G06F 17/30489; G06F 17/30454
See application file for complete search history.

(56) References Cited

U.S. PATENT DOCUMENTS

| | | | | |
|---|---|---|---|---|
| 5,822,751 | A  * | 10/1998 | Gray | G06F 17/30489 |
| 6,289,352 | B1 * | 9/2001 | Proctor | G06F 17/30592 |
| 6,381,605 | B1 * | 4/2002 | Kothuri | G06F 17/30327 |
| 2009/0083253 | A1 * | 3/2009 | Bellamkonda | G06F 17/30592 |
| 2009/0144307 | A1 * | 6/2009 | Bestgen | G06F 17/30489 |

* cited by examiner

*Primary Examiner* — June Sison
(74) *Attorney, Agent, or Firm* — Fish & Richardson P.C.

(57) ABSTRACT

A method for handling data includes receiving a data record. The method further includes adding the count value of the data record to a count value of the top row of a stack when the data record field values are included among the field values of the top row. The method also includes rolling up the top row when less than all of the data record field values are included among the top row field values and the count value of the top row is less than a threshold value. The method further includes outputting the top row and inserting the data record onto the stack as the new top row. The method may also include removing the top row and adding its count value to the count value of a new top row. A system for handling data includes a streaming data handler and a sorter.

23 Claims, 6 Drawing Sheets

STREAMING ROLL-UPS ON STATISTICAL DATA USING A STACK

RELATED APPLICATIONS

This application is a continuation of U.S. patent application Ser. No. 12/239,391, filed Sep. 26, 2008, which is hereby incorporated by reference.

BACKGROUND

1. Field of the Invention

Embodiments of the present invention relate to processing and reporting statistical data.

2. Background Art

Statistical data becomes more useful when it is sorted or grouped before it is reported. Some statistical data may be sorted based on levels of data granularity. For instance, data may be sorted according to broad categories. The data within each broad category may then be sorted according to narrower categories. This sorting may proceed to even more narrow or specific categories or groupings. At some point, any further granularity may not be useful. Such sorting may take place after aggregating statistics from one or many locations.

Once data has been aggregated and sorted, it is often reported to a computer or a human observer for analysis or evaluation. Such reporting may reflect a grouping of data records performed by a computer. This earlier grouping may have helped to limit the size of the data. The grouping may also have compiled any data that would not be very interesting to a user nor would have contributed to his or her analysis. For example, consider a program that provides information regarding business activity, or sales, for a company. Business activity in smaller towns may not result in a significant level of revenue compared to larger cities. When there are many cities to be observed, these data points compete for the attention of an observer. The observer may prefer that the revenues of these smaller towns be added up and placed in a general category representing the total revenue from smaller towns in the state. That is, information is provided only for towns above a certain size, with the remaining towns being grouped into a single record. The data records for the smaller towns would be compiled into a single data record representative of the compiled data. Compilation could then be performed as necessary for broader categories such as states or provinces within a country. The compilation of data may be particularly useful when handling a large amount of data or a large amount of streaming data.

Handling large amounts of streaming data can consume a lot of computer resources. Many present systems for grouping and reporting streaming data use a memory-map based approach. That is, all data is loaded into memory before compiling data records and reporting the data. Such an approach consumes a significant amount of resources and presents scaling difficulties.

BRIEF SUMMARY

Embodiments of the present invention relate to systems and methods for handling data. According to an embodiment, a method for handling data is provided. The method includes receiving a data record having one or more fields and a count value. The method further includes adding the count value of the data record to a count value of the top row of a stack when all values of the fields of the data record are included among the field values of the top row. The method also includes rolling up the top row when less than all of the field values of the data record are included among the field values of the top row and the count value of the top row is less than a threshold value. The method further includes outputting the top row and inserting the data record onto the stack as the new top row of the stack when less than all of the field values of the data record are included among the field values of the top row and the count value of the top row is equal to or greater than the threshold value.

According to a further embodiment, the method includes removing the top row and adding the count value of the removed top row to the count value of the new top row when all of the one or more field values of the top row are included among the one or more field values of the row below the top row after roll-up.

According to an embodiment, a method for handling data is provided. The method includes receiving a data record having values for n fields and a count value, wherein the n fields are ordered from a broader data set grouping to a more specific data set grouping. The method also includes adding the count value of the data record to a count value of the top row of a stack when all n field values of the data record are included among the n field values of the top row. The method further includes replacing the value of a field n of the top row with a wildcard field value and inserting the data record onto the stack as a new top row of the stack when only n−1 of the n field values of the data record are included among the n field values of the top row and the count value of the top row is less than a threshold value. The method also includes outputting the top row and inserting the data record onto the stack as the new top row of the stack when only n−1 of the n field values of the data record are included among the n field values of the top row and the count value of the top row is equal to or greater than the threshold value.

According to another embodiment, a system for handling data is provided. The system includes a streaming data handler configured to receive a data record having one or more fields and a count value, wherein the fields are ordered from a broader data set grouping to a more specific data set grouping. The streaming data handler is also configured to add the count value of the data record to a count value of the top row of a stack when all values of the fields of the data record are included among the field values of the top row. The streaming data handler is also configured to roll-up the top row when less than all of the field values of the data record are included among the field values of the top row and the count value of the top row is less than a threshold value. The streaming data handler is also configured to output the top row and insert the data record onto the stack as the new top row of the stack when less than all of the field values of the data record are included among the field values of the top row and the count value of the top row is equal to or greater than the threshold value.

According to a further embodiment, the streaming data handler is further configured to remove the top row and add the count value of the removed top row to the count value of the new top row when all of the one or more field values of the top row are included among the one or more field values of the row below the top row after roll-up.

According to an embodiment, the system for handling data includes a stack, a record handler, a roll-up module, a comparer and an output module. According to another embodiment, the system includes a sorter.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for handling data. According to an embodiment, this may include rolling-up statistical data. Data roll-up may include combining, adding, transforming, removing, or performing any other step to data that results in one or more data representations that is representative of a greater number of data records or a greater amount of data. The data that is rolled-up may or may not be similar to or categorized with other rolled-up data. A data record may include one or more fields and one or more statistical values. Data records may involve any type of statistical data, including but not limited to, information involving advertising data.

Data may or may not be grouped or sorted prior to roll-up, although sorted data may lead to more efficient roll-ups. To assist sorting, fields within each data record may be ordered. For instance, broader category fields may be ordered before narrower category fields in each data record. It may be more efficient, but not necessary, for separate data records to share the same fields and respective order of the fields. Category is a term that may also represent a class, dimension, key, or any other term or concept that may be used in data organization and processing.

As described further above, sorting may take place according to a broad category. Further sorting may include sorting according to narrower categories or a greater granularity. Sorting may take place from lesser granularity to greater granularity or vice versa. Sorting may also be performed according to other factors or requirements. As can be appreciated by those skilled in the art of data handling, sorting may be performed in any number of ways, including disk-based sorting approaches. Data may be sorted in batches or on the fly. Data may also be performed using multi-way sort algorithms common in existing database systems.

Compilations of statistical data may be performed on streaming data. This involves performing certain actions dynamically as data is received and processed on the fly. According to an embodiment, such real-time actions may include determining whether statistical data value thresholds for predetermined fields have been met. If a threshold has been met for a field value, that data may be immediately saved, output or reported. If a specified threshold has not been met for a certain field value, data records having that field value may be compiled into a single data record (or fewer data records) representative of data involving that field. These steps will be described further in the detailed embodiments herein.

Figure 1:
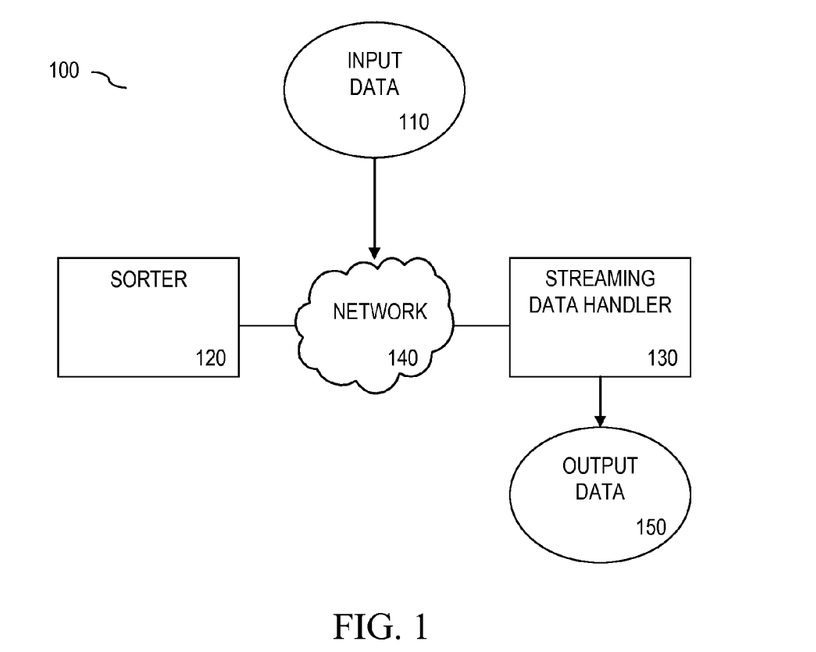
FIG. 1 is a diagram of a system for handling data using a stack, according to an embodiment of the present invention.

FIG. 1 illustrates an exemplary system 100 for handling data, according to an embodiment of the invention. System 100 includes sorter 120 and streaming data handler 130. Sorter 120 and streaming data handler 130 may be connected directly or indirectly, such as over one or more networks 140. Sorter 120 or streaming data handler 130 may receive input data 110 directly or indirectly, such as over network 140. Input data 110 may be received from one or more data sources. Input data 110 may include, for example and without limitation, statistics from one or many locations, including details regarding the locations. Output data 150 is generated by streaming data handler 130. Output data 150 may be output to one or more users directly or indirectly.

According to an embodiment, sorter 120 may be configured to receive data records of input data 110. Data records of input data 110 may include one or more fields. Fields within each data record of input data 110 may be ordered based upon field values, as described above. Sorter 120 may be configured to sort data records according to field values. According to a further embodiment, sorter 120 may be further configured to sort data records according to field values from a broader data set grouping to a more specific data set grouping. A data set grouping refers to a set of records that is sorted based on one or more field values. For instance, a broader data set grouping refers to a set of data records sorted based on a value of a broadest field. For example, where the data record includes a location, a broadest field may include a country corresponding to the location. A more specific data set grouping refers to a set of data records, within a broader data set grouping, that is sorted based on a narrower or more granular field value. For example, where the data record includes a location, a narrow field may include a city corresponding to the location. According to a further embodiment, sorter 120 may not be included in system 100 as the data records of input data 110 may be pre-sorted.

Figure 2:
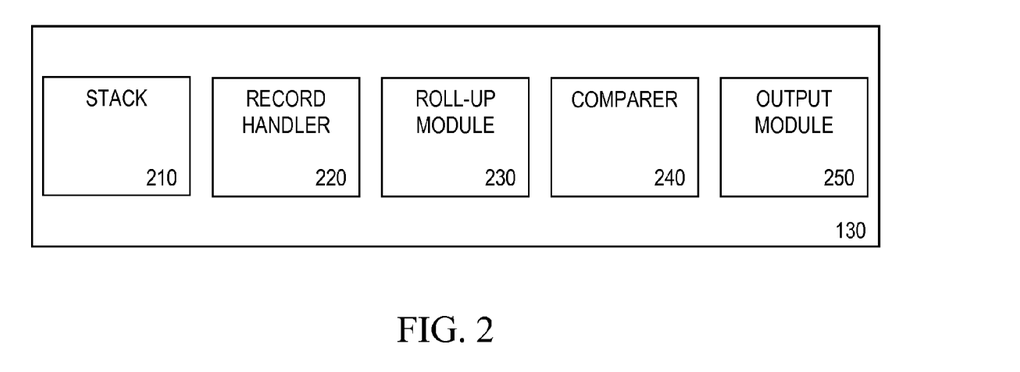
FIG. 2 is a diagram showing a streaming data handler of FIG. 1 in more detail, according to an embodiment of the present invention.

Streaming data handler 130 may be configured to handle data, according to an embodiment. Streaming data handler 130 may include any combination of a stack 210, record handler 220, roll-up module 230, comparer 240 and/or output module 250, as shown in FIG. 2. These components may be connected together directly or indirectly.

Stack 210 is a data structure or other data type used to temporarily store information. This information may include data records, which may be referred to as rows when part of stack 210. Stack 210 may be organized based upon the concept of Last In First Out (LIFO). Data records may be inserted or pushed onto the top of stack 210. Data records may also be removed or popped off of the top of stack 210. Record handler 220 may be configured to add or insert data records onto and remove data records from stack 210. Stack 210 may increase in size with older data records near the bottom of stack 210 and newer data records near the top of stack 210. The terms bottom and top exist independently of whether stack 210 grows in the direction of higher or lower memory addresses. A data record last inserted onto stack 210 may be referred to as a top row. According to an embodiment, stack 210 may be limited to n+1 rows where n is the number of fields in a data record. According to another embodiment, stack 210 may be implemented in CPU registers, software modules, or in any combination of hardware, software, or firmware. According to a further embodiment, more than one stack 210 may be used by streaming data handler 130.

Streaming data handler 130 may be configured to perform roll-ups on a data record. A roll-up, as referred to herein, includes replacing the least significant non-wildcard field of a data record with a wildcard field value. A wildcard field value may be any value or representation that serves to note that the specific value of the field is no longer necessary. According to an embodiment, a wildcard field value may represent an unknown or unimportant field value. According to another embodiment, a wildcard field value may be an '*', '#', or any other representative word, number, or symbol. In an example of a roll-up, row <A, B, C, 30> may be rolled up to <A, B, *, 30>. Applying roll-up again would result in <A, *, *, 30>. Rolling up a row may not necessarily "kill" the row or force the row to be merged with others.

Data roll-ups may be assisted by roll-up module 230, according to an embodiment. For example, roll-up module 230 may be configured to replace the value of a field n of a top row with a wildcard field value. The number n may represent the number of fields in a data record. Respectively, a field n may represent the least significant field, a most specific field, a most granular field, or in some contexts an end-most field. In another embodiment, n may represent the number of non-wildcard fields in a data record. In this case, a field n may be the least significant non-wildcard field value but not necessarily be the most endian value. According to a further embodiment, roll-up module 230 may replace the value of field n of a top row that was popped off stack 210.

A roll-up may be used to form a super row of a data record. A super row, as used herein, may be defined as such: given two rows r1 and r2, r1 is a super row of r2 when the field value of r1 is the same field value of r2 after applying one or multiple roll-ups on r2. For example, <USA, *, *, 10> is a super row of <USA, CA, *, 20> and <USA, CA, San Jose, 30>.

According to an embodiment, streaming data handler 130 may be configured to roll up the top row when less than all of the one or more field values of the data record are included among the one or more field values of the top row and the count value of the top row is less than a threshold value. According to a further embodiment, streaming data handler 130 may be configured to output the top row and insert the data record onto the stack as the new top row when less than all of the one or more field values of the data record are included among the one or more field values of the top row and the count value of the top row is equal to or greater than the threshold value.

According to an embodiment, streaming data handler 130 may be further configured to remove the top row and add the count value of the removed top row to the count value of the new top row when all of the one or more field values of the top row are included among the one or more field values of the row below the top row after roll-up.

According to another embodiment, streaming data handler 130 may be configured to replace the value of a field n of the top row with a wildcard field value and inserting the data record onto the stack as a new top row of the stack when only n−1 of the n field values of the data record are included among the n field values of the top row and the count value of the top row is less than a threshold value. In this case, n−1 field values, or all but the least significant value (field n) of each row below the top row are included among the n field values of the top row. According to an embodiment, it may also be stated that all fields but the least significant field match or are found equal. For instance, a row below the top row may have respective field values [A,B,C,D] with the most significant (broadest) field having a value A and the least significant (most specific) field having a value D. The top row may have respective field values [A,B,C,F]. The values A, B and C of a row below the top row are included among the values A, B, C and F of the top row. In other words, values A, B and C of the row below the top row match the values A, B and C of the top row. Continuing on, if the count value of the top row is 50 and the count value of a row below the top row is 40, the resulting count value of the top row would be 90.

According to a further embodiment, streaming data handler 130 may be configured to remove the top row and add the count value of the removed top row to the count value of a new top row prior to inserting a data record when all field values of the top row are included among the field values of a row below the top row.

Streaming data handler 130 may be configured to receive a data record having values for n fields and a count value, wherein the n fields are ordered from a broader data set grouping to a more specific data set grouping, according to an embodiment. Streaming data handler 130 may also be configured to add the count value of the data record to a count value of the top row of stack 210 when all n field values of the data record are included among the n field values of the top row, according to another embodiment.

According to another embodiment, streaming data handler 130 may be configured to insert a data record onto stack 210. Streaming data handler 130 may insert a data record when the stack is empty. Streaming data handler 130 may insert a data record when the top row is a super row of the data record. Streaming data handler 130 may output the top row when a top row is a super row of a last output row. According to a further embodiment, any these steps may be performed subsequent to roll-up as necessary.

According to another embodiment, a data record may exist or be received having one or more wildcard field values. In such a case, the least significant value (field n) may refer to the least significant non-wildcard value. It may or may not necessarily be a most endian field of a data record. For example, a row such as <A, B, *, 30} may be rolled up to be <A, *, *, 30>. Another rollup would produce <*, *, *, 30>. According to a further embodiment, the n fields of a data record may include only the fields of a data record having non-wildcard values. According to an embodiment, the n fields of a data record may include the fields of a data record more significant than a first most significant field having a wildcard value.

This row comparison may be assisted by comparer 240, according to an embodiment. Comparer 240 may be configured to determine whether a specified number of field values of a first data record are included among a specified number of field values of a second data record, as given in the example above. According to another embodiment, comparer 240 may also be configured to compare more than two rows at a time.

Roll-up module 230 may be further configured to remove each row that added its count value to the count value of the top row, according to an embodiment. That is, once a row has been rolled-up, that row no longer remains in stack 210. For instance, the row which added its count value 40 to the top row would be removed or deleted from stack 210. In this example, the least significant field n is discarded and replaced with a wildcard value. According to another embodiment, roll-up may be performed on a top row more than once. According to a further embodiment, roll-up may be performed for a row below a top row. According to another embodiment, a row that is rolled up may be left in the stack. Such a row may not be removed or merged with other rows.

Streaming data handler 130 may be assisted by output module 250. Output module 250 may be configured to output the top row based upon specified conditions. According to an embodiment, such specified conditions may include, but are not limited to, when the n field values of the input data record are not included among the n field values of the top row, the top row is not a super row of the input data record, the top row is a super row of a last output row, and a count value of a top row equals or exceeds a predetermined threshold. A threshold may include, but is not limited to, a count value threshold. Output module 250 may be configured to output the top row when no more non-zero data records are to be received and the count value of the top row is equal to or exceeds the threshold value. According to another embodiment, depending upon how a threshold is set relative to the expected values, a threshold may be considered exceeded even if a value is empirically lower than a threshold. According to a further embodiment, more than one threshold may be involved.

Either streaming data handler 130, record handler 220, roll-up module 230, comparer 240, or output module 250 may be configured to retain any values of a last row that was output, according to another embodiment. According to yet another embodiment, either streaming data handler 130, record handler 220, roll-up module 230, comparer 240, or output module 250 may be configured to retain a cumulative count value of output rows having n−1 field values that are included among the n−1 field values of the top row. According to a further embodiment, either streaming data handler 130, record handler 220, roll-up module 230, comparer 240, or output module 250 may be configured to add the cumulative count value to an output row when the n−1 field values of the output row are included among the n−1 field values of previously output rows and the value of field n of the output row is the wildcard value.

According to an embodiment, streaming data handler 130 may be further configured to perform the following steps. First, streaming data handler 130 performs roll-up once on the top row (i.e., replacing the last non-wildcard field with a wildcard value). Next, streaming data handler 130 removes the top row and adds to the count value of the removed top row to the count value of the new top row when the top row has the same n field values as the row below it after rollup. Streaming data handler 130 then outputs the top row. Finally, streaming data handler 130 inserts the data record onto stack 210 as a new top row.

Streaming data handler 130 may be further configured to replace the value of field n−1 of the top row with the wildcard field value before outputting the top row when the value of field n−1 of the data record is the wildcard value, according to an embodiment. According to another embodiment, streaming data handler 130 may be configured to insert a data record onto stack 210 as a top row if stack 210 is empty. According to an embodiment, streaming data handler 130 may be configured to insert a data record onto stack 210 as a top row when the current top row of stack 210 is a super row of the data record. According to a further embodiment, streaming data handler may be further configured to repeat any of the above steps as necessary.

According to an embodiment, streaming data handler 130 may be implemented by a processor connected to a tangible computer readable medium with computer logic stored thereon. According to a further embodiment, streaming data handler 130 may be implemented in software modules, hardware, firmware or any combination thereof. According to another embodiment, streaming data handler may be implemented in a computer system, which may include, but is not limited to, a computer, a workstation, a server, a laptop, a handheld device (such as a mobile phone, smart phone, or personal data assistant), a kiosk, a game console, a set-top box, or a television.

Figure 3A:
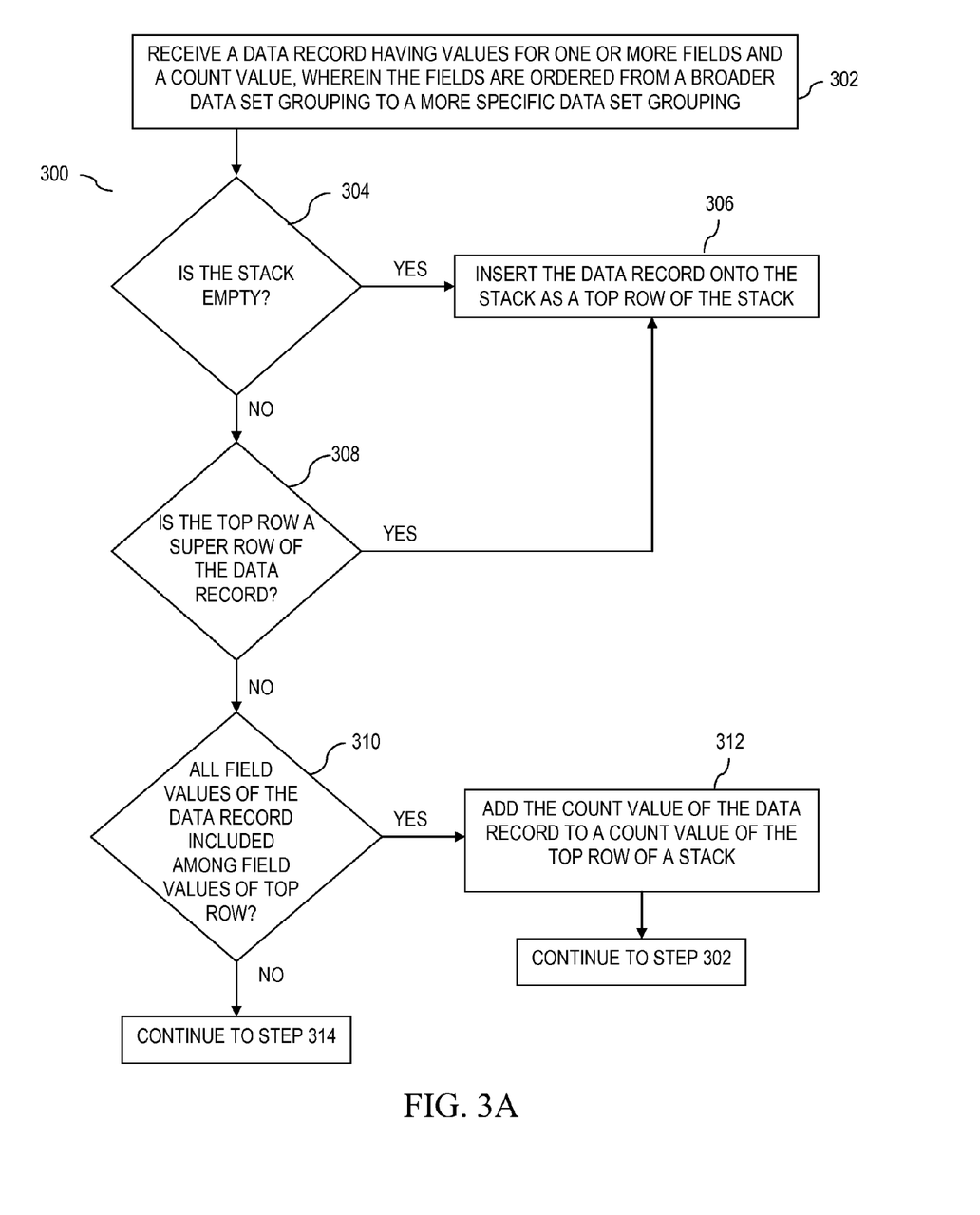
FIGS. 3A-3B are a flowchart illustrating a method for handling data using a stack, according to an embodiment of the present invention.
Figure 3B:
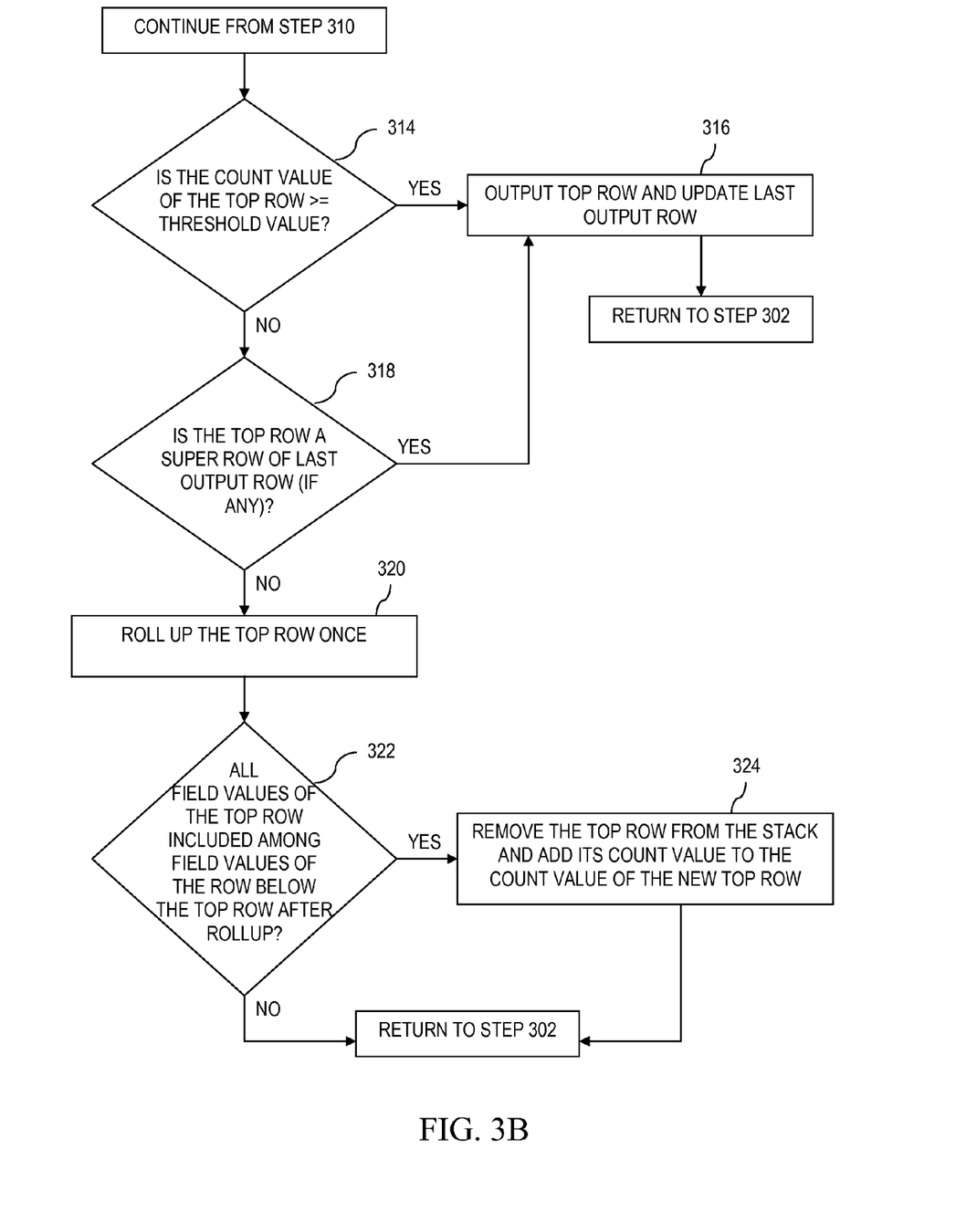

FIGS. 3A and 3B illustrate an exemplary method 300 for handling data that may roll up records based upon the presence of a super row, according to an embodiment. In step 302, a data record having values for the fields and a count value are received, wherein the fields are ordered from a broader data set grouping to a more specific data set grouping. In step 304, it is determined whether the stack is empty. If so, method 300 proceeds to step 306. Otherwise, method 300 proceeds to step 308. In step 306, a data record may be inserted into the stack as a top row of the stack. In step 308, it is determined whether the top row is a super row of the data record. A super row is defined above. If so, method 300 proceeds to step 306. Otherwise, method 300 proceeds to step 310. In step 310, it is determined whether all the data record field values are included among the field values of the top row. If so, method 300 proceeds to step 312. Otherwise, method 300 proceeds to step 314 (shown in FIG. 3B). In step 312, a count value of the data record is added to a count value of the top row of a stack. According to an embodiment, streaming data handler 130 may be configured to perform steps 302-312.

In step 314, it is determined whether a top row count value is greater than or equal to a threshold value. If so, method 300 proceeds to step 316. Otherwise, method 300 proceeds to step 318. In step 316, the top row (its values) is output and a last output row value is updated. In an embodiment, outputting a top row may include reporting the top row to a user by, for example, displaying the results. In step 318, it is determined whether a top row is a super row of the last output row. If so, method 300 proceeds to step 316. Otherwise, method 300 proceeds to step 320. In step 320, the top row is rolled up once. According to a further embodiment, this rollup may include replacing a field value with a wildcard value. Method 300 then proceeds to step 322. In step 322, it is determined whether all the field values of the top row are included among the field values of the row below the top row after rollup. If so, method 300 proceeds to step 324. Otherwise, method 300 returns to step 302. In step 324, a count value of the top row is added to a count value of the top row of the new top row. This may be done subsequent to removing the top row. Method 300 then returns to step 302. According to an embodiment, streaming data handler 130 may be configured to perform steps 314 and 318-324. Streaming data handler 130 may also be configured to perform step 316. According to a further embodiment, method 300 returns to step 302 if another data record is to be processed.

Figure 4A:
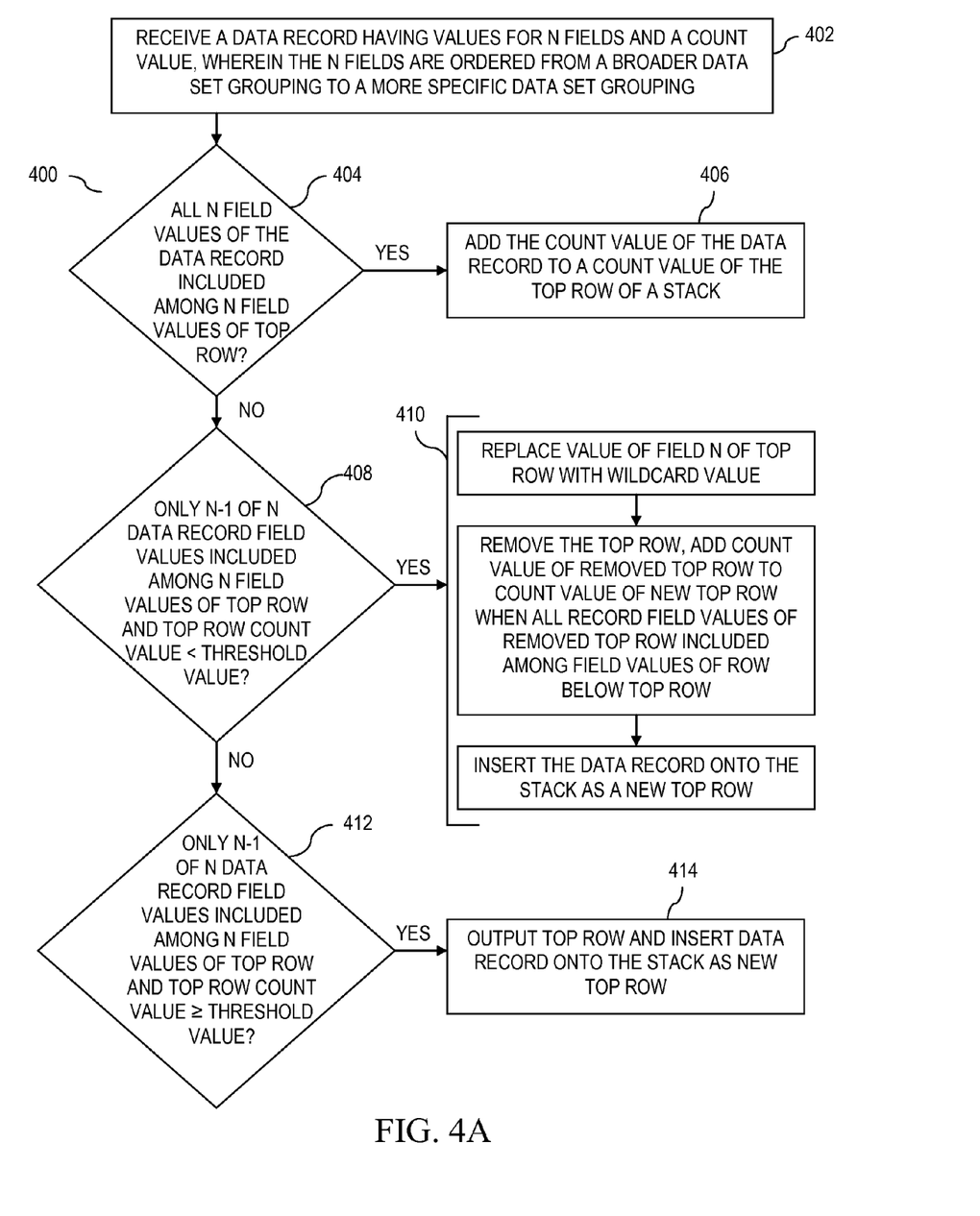
FIGS. 4A-4C are a flowchart illustrating another method for handling data using a stack, according to an embodiment of the present invention.
Figure 4B:
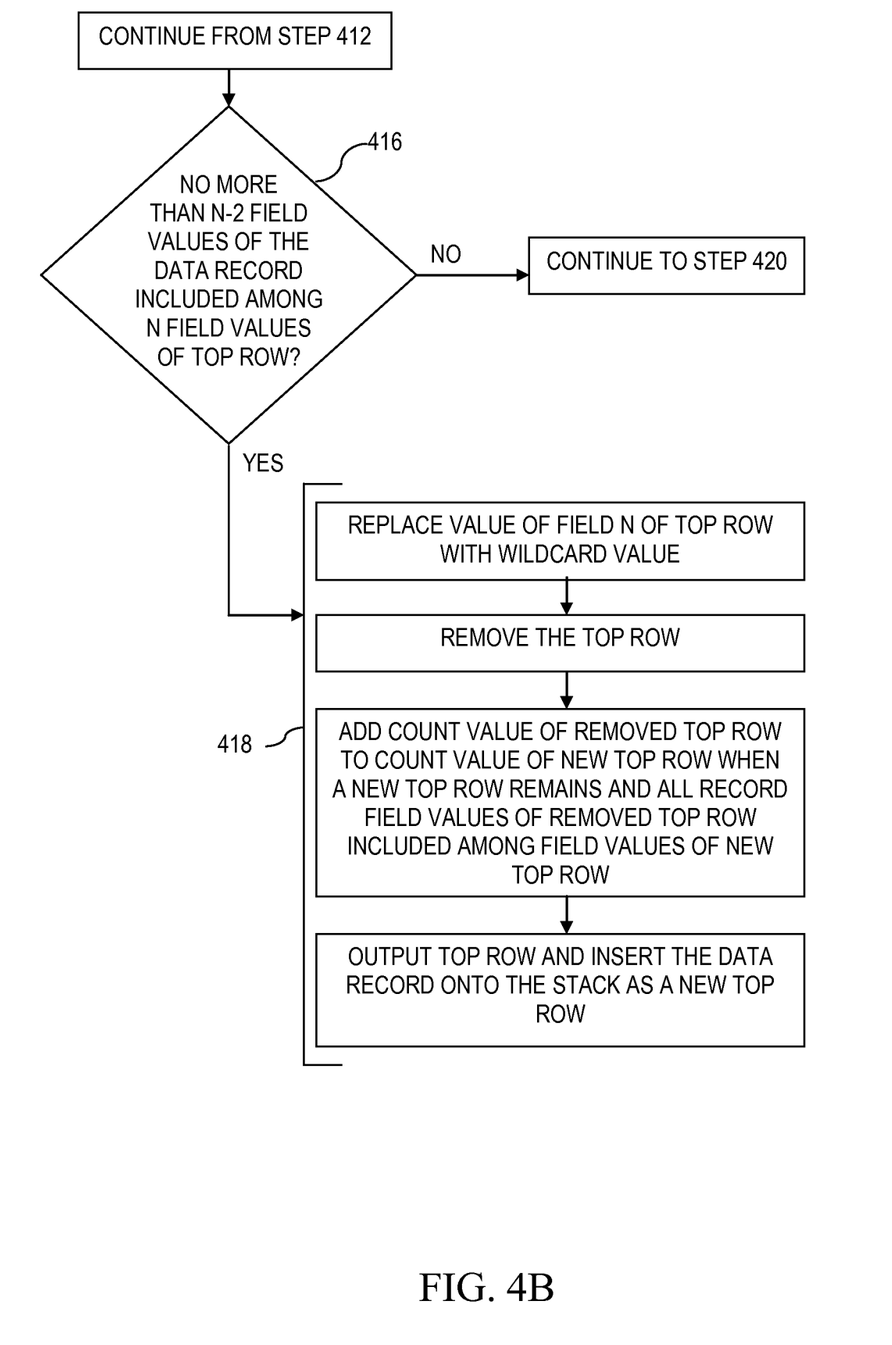
Figure 4C:
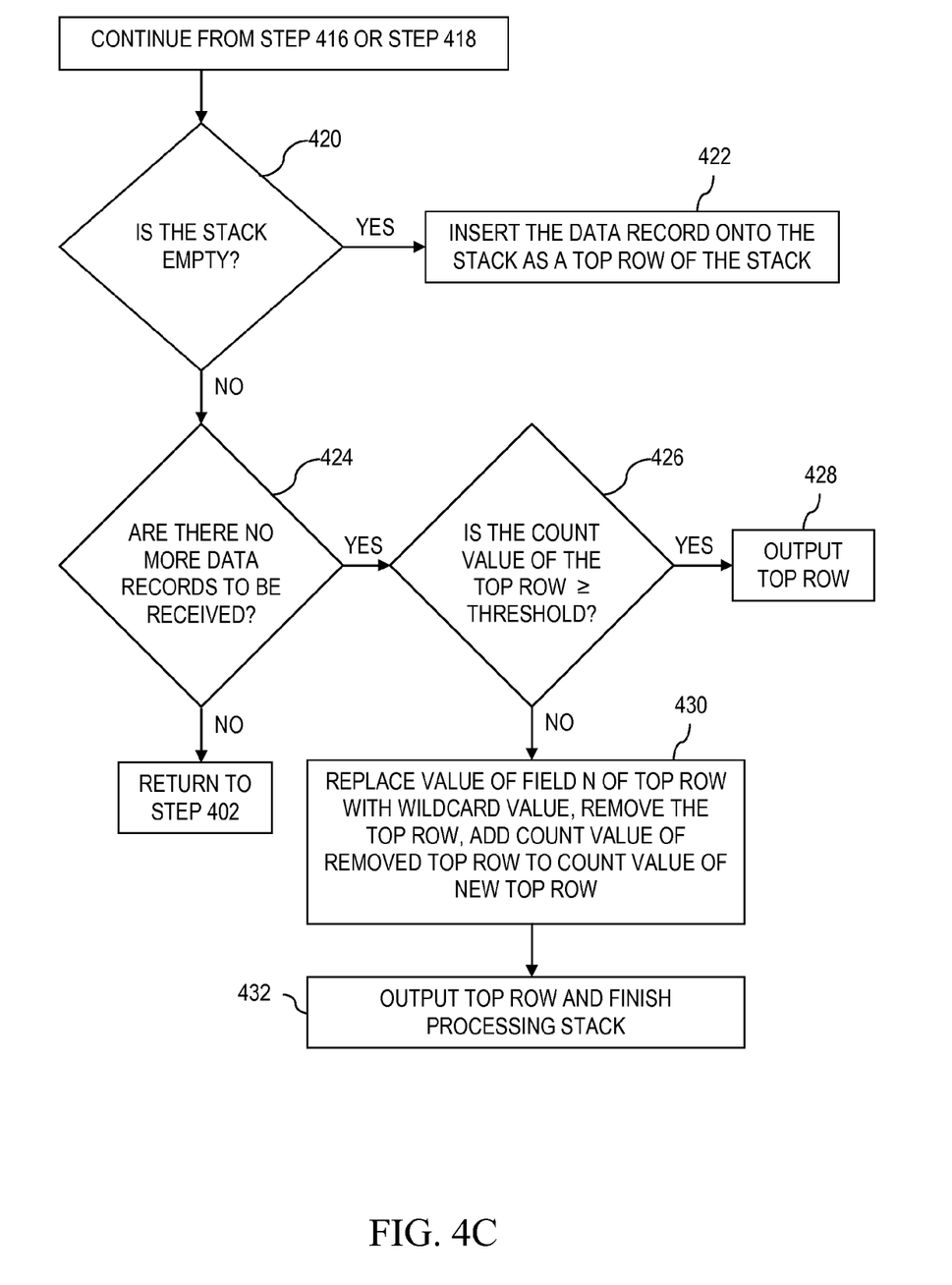

FIGS. 4A-4C illustrate an exemplary method 400 for handling data, according to an embodiment. In step 402, a data record having values for n fields and a count value are received, wherein the n fields are ordered from a broader data set grouping to a more specific data set grouping. In step 404, it is determined whether all n field values of the data record are included among n field values of the top row. If so, method 400 proceeds to step 406. Otherwise, method 400 proceeds to step 408. In step 406, a count value of the data record is added to a count value of the top row of a stack. In step 408, it is determined whether only n−1 of n data record field values are included among n field values of the top row and a top row count value is less than a threshold value. If so, method 400 proceeds to step 410. Otherwise, method 400 proceeds to step 412. In step 410, the value of field n of the top row is replaced with a wildcard value and the data record is inserted onto the stack as a new top row. The top row is removed and the count value of the removed top row is added to the count value of the new top row if all record field values of the top row are included among the fields values of the row below the top row. In step 412, it is determined whether only n−1 of n data record field values are included among n field values of top row and the top row count value is greater than or equal to a threshold value. If so, method 400 proceeds to step 414. Otherwise, method 400 proceeds to step 416 (shown in FIG. 3B). In step 414, the top row is output and the data record is inserted into the stack as a new top row. In an embodiment, outputting a top row may include reporting the top row to a user. According to an embodiment, streaming data handler 130 may be configured to perform steps 402-410. Streaming data handler 130 may also be configured to perform steps 412-414.

In step 416, it is determined whether no more than n−2 field values of the data record are included among n field values of the top row. If so, method 400 proceeds to step 418. Otherwise, method 400 proceeds to step 420 (shown in FIG. 4C). In step 418, the value of field n of the top row is replaced with a wildcard value and the data record is inserted onto the stack as a new top row. The top row is removed and the count value of the removed top row is added to the count value of the new top row if all record field values of the top row are included among the fields values of the row below the top row. The top row is output and the data record is inserted onto stack 210. Method 400 then proceeds to step 420. According to an embodiment, streaming data handler 130 may be configured to perform any of steps 416-418.

In step 420, it is determined whether the stack is empty. When the stack is empty, method 400 proceeds to step 422. Otherwise, method 400 proceeds to step 424. In step 422, the data record is inserted onto the stack as a top row of stack 210. In step 424, it is determined whether there are no more data records to be received. If there are no more data records to be received, method 400 proceeds to step 426. Otherwise, method 400 returns to step 402. In step 426, it is determined whether the count value of the top row is greater than or equal to a threshold value. If so, method 400 proceeds to step 428. Otherwise, method 400 proceeds to step 430. In step 428, the top row is output. In step 430, the value of field n of the top row is replaced with a wildcard value. The top row is removed and its count value added to the new top row. Method 400 then proceeds to step 432. In step 432, the top row is output and the rest of the stack is processed. In this case, if a top row remains, step 430 may be repeated. Field n−1 of a top row may also be replaced with a wildcard value in this step. It may then be output. According to an embodiment, streaming data handler 130 may be configured to perform steps 420-426. Streaming data handler 130 may also be configured to perform steps 428, 430 and 432. Output module 250 may be configured to perform step 428 and assist with step 432.

According to an embodiment, this additional processing of step 432 may include performing roll-up again as necessary and outputting any resulting top rows. According to another embodiment, this additional processing may include outputting the top row when the count value of the top row is equal to or greater than the threshold value. According to a further embodiment, this additional processing may further include replacing the value of field n−1 of the top row with the wildcard field value, adding to the count value of the top row the count value of each row below the top row having only n−2 field values that are included among the n field values of the top row, removing each row that added its count value to the count value of the top row, and outputting the top row when the count value of the top row is less than a threshold value. Method 400 may be performed by system 100 (shown in FIG. 1), according to an embodiment, but is not necessarily so limited. According to another embodiment, method 400 may be performed by, for example and without limitation, any combination of stack 210, record handler 220, roll-up module 230, comparer 240 and output module 250.

Processing may also involve retaining field and count values of a last row output, according to an embodiment. According to another embodiment, processing may include retaining a cumulative count value of output rows having n−1 field values that are included among the n−1 field values of the top row. According to a further embodiment, processing may include adding a cumulative count value to an output row when the n−1 field values of the top row are included among the n−1 field values of previously output rows and the value of field n of the output row is the wildcard value. According to another embodiment, processing may include adding a cumulative count value to an output row when the n−1 field values of an output row are included among the n−1 field values of previously output rows and the value of field n of the output row is the wildcard value. According to an embodiment, method 300 may further include sorting the data records to be received according to field values.

An additional example is provided, according to another embodiment of the present invention. To assist with the following example, a further explanation of a super row is provided. A super row, as described above, may be defined as such: given two rows r1 and r2, r1 is a super row of r2 when the field value of r1 is the same field value of r2 after applying one or multiple roll-ups on r2. For example, <USA, *, *, 10> is a super row of <USA, CA, *, 20> and <USA, CA, San Jose, 30>. In particular, applying one rollup on <USA, CA, *, 20> may result in <USA, *, *, 20>, whose n−2 field value is the same as the n−1 field value of <USA, *, *, 10>. For <USA, CA, San Jose, 30>, two rollups are applied to achieve the same result. On the other hand, <USA, CA, *, 10> is not a super row of <USA, WA, Seattle, 20> because 'CA' is different from 'WA'. Also, a row can never be a super row of itself. In another example, when rows r1 and r2 are neighboring rows in a stack with r1 being the bottom row, r1 is a super row of r2.

In this exemplary embodiment, a stack is initially empty. The last row output may be recorded during the process. Initially, the last row output is set to none. The following input rows are used in a description of an example embodiment: <US, CA, Palo Alto, 10>; <US, CA, Mountain View, 110>; <US, CA, Sunnyvale, 20>; <US, MA, Boston, 40>; <US, MA, Arlington, 80>; <US, WA, Seattle, 30>. Example steps 1-7 are provided in Table 1 as follows. Column 3 lists steps that are executed to process the input record. These steps are similar to the steps shown in the exemplary flowchart of FIGS. 3A and 3B. Column 4 shows the resulting stack and the value of the last output row after the input data record is processed.

TABLE 1

| Row | Input Row | Steps Executed to Process Input Row | Processing the Input Row |
| --- | --- | --- | --- |
| 1 | <US, CA, Palo Alto, 10> | Receive an input row data record. The stack is empty, so push the input row onto the stack. | Resulting stack: <US, CA, Palo Alto, 10> Last output row: none |

TABLE 1-continued

| Row | Input Row | Steps Executed to Process Input Row | Processing the Input Row |
|---|---|---|---|
| 2 | <US, CA, Mountain View, 110> | The stack is not empty and the top row is not a super row of the input row.<br>Not all the fields of the input row match the fields of the top row and the count value of the top row is below the threshold count value.<br>There is no last output row, so perform roll-up once. The top row is <US, CA, *, 10>.<br>Not all the fields of the top row match the fields of the row below the top row after roll-up.<br>Repeating . . .<br>The stack is not empty and top row is a super row of the input row, so push the input row onto the stack. | Resulting stack:<br><US, CA, Mountain View, 110><br><US, CA, *, 10><br>Last output row:<br>none |
| 3 | <US, CA, Sunnyvale, 20> | The stack is not empty and the top row is not a super row of the input row.<br>Not all the fields of the input row match the fields of the top row but the count value of the top row reaches the threshold count value, so output the top row and update the last output row.<br>Repeating . . .<br>The top row is a super row of the input row so push the input row onto the stack. | Resulting stack:<br><US, CA, Sunnyvale, 20><br><US, CA, *, 10><br>Last output row:<br><US, CA, Mountain View, 110> |
| 4 | <US, MA, Boston, 40> | The stack is not empty and the top row is not a super row of the input row.<br>Not all the fields of the input row match the fields of the top row and the count value of the top row is below the threshold count value.<br>The top row is not a super row of the last output row, so perform roll-up once. The top row is <US, CA, *, 20>,<br>All the fields of the top row match the fields of the row below the top row after roll-up, so remove the top row and add its count value to the count value of the new top row. The top row is <US, CA, *, 30>.<br>Repeating . . .<br>The stack is not empty and the top row is not a super row of the input row.<br>Not all the fields of the input row match the fields of the top row and the count value of the top row is below the threshold count value.<br>The top row is a super row of the last output row, so output the top row and update the last output row. | Resulting stack:<br><US, MA, Boston, 40><br>Last output row:<br><US, CA, *, 30> |
| 5 | <US, MA, Arlington, 80> | The stack is not empty and the top row is not a super row of the input row.<br>Not all the fields of the input row match the fields of the top row and the count value of the top row is below the threshold count value.<br>The top row is not a super row of the last output row, so perform roll-up once. The top row is <US, MA, *, 40>.<br>Not all the fields of the top row match the fields of the row below the top row after roll-up.<br>Repeating . . .<br>The stack is not empty and the top row is a super row of the input row, so push the input row onto the stack. | Resulting stack:<br><US, MA, Arlington, 80><br><US, MA, *, 40><br>Last output row:<br><US, CA, *, 30> |
| 6 | <US, WA, Seattle, 30> | The stack is not empty and the top row is not a super row of the input row.<br>Not all the fields of the input row match the fields of the top row and the count value of the top row is below the threshold count value.<br>The top row is not a super row of the last output row, so perform roll-up once. The top row is <US, MA, *, 80>.<br>All the fields of the top row match the fields of the row below the top row after roll-up, so remove the top row and add its count value | Resulting stack:<br><US, WA, Seattle, 30><br>Last output row:<br><US, MA, *, 120> |

TABLE 1-continued

| Row | Input Row | Steps Executed to Process Input Row | Processing the Input Row |
|---|---|---|---|
| | | to the count value of the new top row. The top row is <US, MA, *, 120>. Repeating . . . The stack is not empty and the top row is not a super row of the input row. Not all the fields of the input row match the fields of the top row and the count value of the top row reaches the threshold count value, so output the top row and update the last output row. Repeating . . . The stack is empty, so push the input row onto the stack. | |
| 7 | End of input Virtually, we have an input row <*, *, *, 0> | The stack is not empty and the top row is not a super row of the input row. Not all the fields of the input row match the fields of the top row and the count value of the top row is below the threshold count value. The top row is not a super row of the last output row, so perform roll-up once. The top row is <US, WA, *, 30> Not all the fields of the top row match the fields of the row below the top row after roll-up. Repeating . . . The stack is not empty and the top row is not a super row of the input row. Not all the fields of the input row match the fields of the top row and the count value of the top row reaches the threshold count value, so output the top row and update the last output row. Repeating . . . The stack is empty, so push the input row onto the stack. | Resulting stack: <*, *, *, 0> Last output row: <US, WA, *, 30> |

As a result of the example embodiment, the final output rows are: <US, CA, Mountain View, 110>; <US, CA, *, 30>; <US, MA, *, 120>; and <US, *, *, 30>. These output rows may be reported as a grouping of data records to assist a user in a business decision. For example, such reporting may reflect a grouping of data records regarding business activity or sales for a company. Business activity in smaller towns may not result in a significant level of revenue compared to larger cities. The observer may prefer that in the report the revenues of these smaller towns be added up and placed in a general category representing the total revenue from smaller towns in the state. A user may decide to increase or decrease business activity in a town or city based upon the reporting. A user may be a human or a computer. Embodiments of this invention provide for a quicker and more streamlined approach to providing this type of useful data to business decisionmakers.

A second example is also provided, according to an embodiment. In the first step, the stack is compressed based on the input data record (this routine is herein called CompressStack). After compression, the stack may be left in one of three states:

S1: The stack is empty.
S2: The stack is not empty, and the top row has the same field values or key as the input row.
S3: The stack is not empty, and the top row is a super row of the input row.

In the second step, according to this exemplary embodiment, the input row may be processed as follows:

P1: If the stack is in state S1 or S3, the input row is pushed to the stack (while preserving the property).

P2: If the stack is in state S2, the input row is merged into the top row (by adding the value of the input row to the top row).

It should be noted that the exemplary routine CompressStack is self recursive. The goal of the CompressStack routine is to convert the current stack into one of the three states described above, by performing rollups or outputting rows.

CompressStack takes two parameters: the stack and the current input data record. An exemplary algorithm is listed as follows:

L1: If the current stack is already is one of the three states, return.
L2: Define the following two conditions:
    C1: The value of the top row is above the predefined threshold
    C2: The last output row is none, or the top row is a super row of the last output row
L3: If either C1 or C2 is true, do the following:
    L31: Output the top row
    L32: Update the last output row as the row just output.
L4: Otherwise (i.e., neither C1 nor C2 is true), do the following:
    L41: Pop the top row from the stack and apply rollup on it once. Let r be the resulting row.
    L42: If the stack is not empty and row r is same as the new top row, merge row r into the top row L43: Otherwise, push row r onto the stack L5: Call CompressStack When all the input data records or input rows are consumed, the rows in the stack are processed. This can be done in two steps:

X1: Call CompressStack using a virtual row with all the key fields as UNKNOWN.

X2: If the stack is not empty, it must contain a single row with all the key fields being UNKNOWN. This row is then output.

The following input rows are used in a description of an example embodiment: <US, CA, Palo Alto, 10>; <US, CA, Mountain View, 110>; <US, CA, Sunnyvale, 20>; <US, MA, Boston, 40>; <US, MA, Arlington, 80>; <US, WA, Seattle, 30>. In this hypothetical example, the rollup threshold is 100, meaning that roll-up is performed if the value of a row is smaller than 100. Example steps 1-7 are provided in Table 2 as follows. Column 3 lists steps that are executed to process the input record, including compressing the stack. Column 4 shows the resulting stack and the value of the last output row after the input data record is processed.

TABLE 2

| Row | Input Row | CompressStack | Processing the Input Row |
| --- | --- | --- | --- |
| 1 | <US, CA, Palo Alto, 10> | Immediately return at $L_1$ | Since stack is empty (i.e., state $S_1$), push the input row. Resulting stack: <US, CA, Palo Alto, 10> Last output row: none |
| 2 | <US, CA, Mountain View, 110> | The value of the top row is below 100 ($C_1$ not true), and the top row is not a super row of the input row (C2 not true), execute $L_4$ ($L_{41}$ and $L_{43}$). The next recursive call of CompressStack at $L_5$ does not change stack. Stack after CompressStack: <US, CA, *, 10> | Stack state is $S_3$; push the input row onto stack. Resulting stack: <US, CA, Mountain View, 110> <US, CA, *, 10> Last output row: none |
| 3 | <US, CA, Sunnyvale, 20> | The value of the top row is not above 100 ($C_1$ is true); execute $L_3$ ($L_{31}$ and $L_{32}$). The output row is <US, CA, Mountain View, 110>. The next recursive call of CompressStack does not change the stack. Stack after CompressStack: <US, CA, *, 10> | Stack state is $S_3$; push the input row onto stack. Resulting stack: <US, CA, Sunnyvale, 20> <US, CA, *, 10> Last output row: <US, CA, Mountain View, 110> |
| 4 | <US, MA, Boston, 40> | The value of the top row is below 100 ($C_1$ not true), and the top row is not a super row of the input row ($C_2$ not true), execute $L_4$ ($L_{41}$ and $L_{42}$). Notice that the rollup row is merged into stack at $L_{42}$, the stack becomes <US, CA, *, 30>. Condition the next recursive call of CompressStack invoked at $L_5$. The top row (i.e., <US, CA, *, 30>) is a super row of the last output row (C2 is true). The lines $L_3$ ($L_{31}$ and $L_{32}$) are executed. The output row is <US, CA, *, 30>. The next recursive call of CompressStack at $L_5$ does not change stack. Stack after CompressStack: (Empty) | Stack state is $S_1$; push the input row onto stack. Resulting stack: <US, MA, Boston, 40> Last output row: <US, CA, *, 30> |
| 5 | <US, MA, Arlington, 80> | Neither $C_1$ nor $C_2$ is true. Execute $L_{41}$ and $L_{43}$. The resulting stack is <US, MA, *, 40>. The next recursive call of CompressStack at $L_5$ does not change stack. Stack after CompressStack: <US, MA, *, 40> | Stack state is S3; push the input row onto stack. Resulting stack: <US, MA, Arlington, 80> <US, MA, *, 40> Last output row: <US, CA, *, 30> |
| 6 | <US, WA, Seattle, 30> | Neither $C_1$ nor $C_2$ is true. Execute $L_{41}$ and $L_{42}$. The resulting stack is <US, MA, *, 120>. Consider the next recursive call of CompressStack at L5. Condition C1 is true. Execute $L_{31}$ and $L_{32}$. The output row is <US, MA, *, 120>. | Stack state is $S_1$; push the input row onto stack. Resulting stack: <US, WA, Seattle, 30> Last output row: <US, MA, *, 120> |
| 7 | End of input Virtually, we have an input row <*, *, *, 0> | We execute $L_{41}$ and $L_{42}$ twice and change the stack to <US, *, *, 30>. In the third call of CompressStack, we output <US, *, *, 30> because it is a super row of the last output row. | |

As a result of the example embodiment, the final output rows are: <US, CA, Mountain View, 110>; <US, CA, *, 30>; <US, MA, *, 120>; and <US, *, *, 30>.

Aspects of the present invention, for exemplary system 100, streaming data handler 130, method 300, method 400, Table 1 and/or Table 2 or any part(s) or function(s) thereof may be implemented using hardware, software modules, firmware, tangible computer readable media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for handling data comprising:
   (a) receiving an electronic data record having one or more fields and a count value;
   (b) adding, by one or more computer systems, the count value of the data record to a count value of the top row of a stack when all values of the one or more fields of the data record are included among one or more field values of the top row;
   (c) rolling up, by one or more computer systems, the top row when less than all of the one or more field values of the data record are included among the one or more field values of the top row and the count value of the top row is less than a threshold value; and removing the top row and adding the count value of the removed top row to the count value of the new top row when all of the one or more field values of the top row are included among the one or more field values of the row below the top row after roll-up;
   (d) outputting, by one or more computer systems, the top row when a top row of the stack is a super row of a last output row, wherein the top row is a super row of the last output row if non-wildcard field values of the top row remain the same as the field values of the last output row after one or more rollups of the last output row; and outputting the top row and inserting the data record onto the stack as the new top row when less than all of the one or more field values of the data record are included among the one or more field values of the top row and the count value of the top row is equal to or greater than the threshold value; and
   (e) reporting the output top row to a user as an indication of data record grouping.

2. The computer-implemented method of claim 1, further comprising:
   (f) inserting the data record onto the stack as a top row when the top row is a super row of the data record.

3. The computer-implemented method of claim 1, further comprising:
   (f) inserting the data record onto the stack as a top row when the stack is empty.

4. The computer-implemented method of claim 1, further comprising:
   (f) performing at least one of steps (d)-(e) subsequent to step (c).

5. A computer-implemented method for handling data comprising:
   (a) receiving a data record having values for n fields and a count value, wherein the n fields are ordered from a broader data set grouping to a more specific data set grouping;
   (b) adding, by one or more computer systems, the count value of the data record to a count value of the top row of a stack when all n field values of the data record are included among the n field values of the top row;
   (c) replacing, by the one or more computer systems, the value of a field n of the top row with a wildcard field value and inserting the data record onto the stack as a new top row of the stack when only n−1 of the n field values of the data record are included among the n field values of the top row and the count value of the top row is less than a threshold value; and removing the top row and adding the count value of the removed top row to the count value of a new top row prior to inserting the data record when all field values of the top row are included among the field values of a row below the top row;
   (d) outputting, by the one or more computer systems, the top row and inserting the data record onto the stack as the new top row of the stack when only n−1 of the n field values of the data record are included among the n field values of the top row and the count value of the top row is equal to or greater than the threshold value;
   (e) reporting the output top row to a user as an indication of data record grouping; and
   (f) replacing the value of a field n of the top row with the wildcard field value, outputting the top row, and inserting the data record onto the stack as a new top row when no more than n−2 field values of the data record are included among the n field values of the top row.

6. The computer-implemented method of claim 5, wherein step (f) further comprises removing the top row and adding the count value of the removed top row to the count value of a new top row prior to outputting the new top row when all field values of the top row are included among the field values of a row below the top row.

7. The computer-implemented method of claim 5, wherein n is a number of fields of the top row having non-wildcard values prior to step (c).

8. The computer-implemented method of claim 5, further comprising:
   (g) repeating step (a) and performing at least one of steps (b)-(e) as necessary.

9. The computer-implemented method of claim 5, further comprising outputting the top row when no more non-zero data records are to be received and the count value of the top row is equal to or greater than the threshold value.

10. The computer-implemented method of claim 5, further comprising replacing the value of a field n of the top row with the wildcard field value and outputting the top row when no more non-zero data records are to be received and the count value of the top row is less than a threshold value.

11. The computer-implemented method of claim 10, further comprising removing the top row and adding the count value of the removed top row to the count value of a new top row prior to outputting the new top row when all field values of the top row are included among the field values of a row below the top row.

12. The computer-implemented method of claim 11, further comprising replacing the value of field n−1 of the new top row with the wildcard field value prior to outputting the new top row when the count value of the new top row is less than a threshold value.

13. The computer-implemented method of claim 5, further comprising retaining the values of the last row that was output.

14. The computer-implemented method of claim 5, further comprising retaining a cumulative count value of output rows having n−1 field values that are included among the n−1 field values of the top row.

15. The computer-implemented method of claim 14, further comprising adding the cumulative count value to an output row when the n−1 field values of the output row are included among the n−1 field values of previously output rows and the value of field n of the output row is the wildcard value.

16. The computer-implemented method of claim 5, further comprising sorting the data records to be received according to field values.

17. The computer-implemented method of claim 16, wherein the sorting further comprises sorting the data records according to the field values from a broader data set grouping to a more specific data set grouping.

18. A system for handling data comprising:
a memory with instructions stored thereon, wherein the instructions include a streaming data handler that when executed by one or more processors cause the one or more processors to perform operations comprising:
(a) receiving a data record having values for one or more fields and a count value, wherein the one or more fields are ordered from a broader data set grouping to a more specific data set grouping;
(b) adding the count value of the data record to a count value of the top row of a stack when all of the one or more field values of the data record are included among one or more field values of the top row;
(c) rolling up the top row when less than all of the one or more field values of the data record are included among the one or more field values of the top row and the count value of the top row is less than a threshold value; and removing the top row and add the count value of the removed top row to the count value of the new top row when all of the one or more field values of the top row are included among the one or more field values of the row below the top row after roll-up;
(d) outputting the top row when a top row of the stack is a super row of a last output row, wherein the top row is a super row of the last output row if non-wildcard field values of the top row remain the same as the field values of the last output row after one or more rollups of the last output row; and outputting the top row and insert the data record onto the stack as the new top row when less than all of the one or more field values of the data record are included among the one or more field values of the top row and the count value of the top row is equal to or greater than the threshold value; and
(e) reporting the output top row to a user as an indication of data record grouping.

19. The system of claim 18, wherein the streaming data handler inserts the data record onto the stack as a top row when at least one of the stack is empty or the top row is a super row of the data record.

20. The system of claim 18, further comprising a sorter, wherein the sorter sorts the data records according to the one or more field values from a broader data set grouping to a more specific data set grouping.

21. The system of claim 18, wherein the streaming data handler comprises:
a stack;
a record handler, wherein the record handler adds a data record to the stack and remove a data record from the stack; and
a roll-up module, wherein the roll-up module rolls-up a data record.

22. The system of claim 21, wherein the streaming data handler further comprises:
a comparer, wherein the comparer determines whether a specified number of field values of a first data record are included among a specified number of field values of a second data record; and
an output module, wherein the output module outputs a top row based upon specified conditions.

23. The system of claim 22, wherein the output module outputs the top row when no more non-zero data records are to be received and the count value of the top row is equal to or greater than the threshold value.

* * * * *